US012410839B2

(12) United States Patent
Sim et al.

(10) Patent No.: US 12,410,839 B2
(45) Date of Patent: Sep. 9, 2025

(54) CONNECTION STRUCTURE OF OIL HOSE FOR TRANSMISSION (71) Applicant: HS R & A Co., Ltd., Yangsan-si (KR)

(72) Inventors: Jae Won Sim, Yangsan-si (KR); Jae Hyeok Choi, Yangsan-si (KR); Guk Hyun Kim, Yangsan-si (KR); Young Jun Kim, Yangsan-si (KR); Jun Young Bae, Yangsan-si (KR); Ho Yeon Lee, Yangsan-si (KR)

(73) Assignee: HS R & A CO., LTD., Gyeongsangnam-Do (KR)

( * ) Notice: Subject to any disclaimer, the term of this patent is extended or adjusted under 35 U.S.C. 154(b) by 0 days.

(21) Appl. No.: 18/538,770

(22) Filed: Dec. 13, 2023

(65) Prior Publication Data
US 2025/0172178 A1 May 29, 2025

(30) Foreign Application Priority Data

Nov. 24, 2023 (KR) .................. 10-2023-0165127

(51) Int. Cl.
F16L 33/01 (2006.01)
F16D 48/02 (2006.01)
F16L 33/207 (2006.01)

(52) U.S. Cl.
CPC .............. F16D 48/02 (2013.01); F16L 33/01 (2013.01); F16L 33/2076 (2013.01); F16D 2048/0224 (2013.01)

(58) Field of Classification Search
CPC ....... F16L 33/01; F16L 33/20; F16L 33/2071; F16L 33/2076; F16L 33/213; F16L 33/207; F16L 33/2073; F16L 33/2075
See application file for complete search history.

(56) References Cited

U.S. PATENT DOCUMENTS 2,374,225 A * 4/1945 Melsom ............... F16L 33/2076
3,549,180 A * 12/1970 Macwilliam .......... F16L 33/207
(Continued)

FOREIGN PATENT DOCUMENTS

CH 628722 A * 3/1982 .......... F16L 33/2071
CN 206478360 U 9/2017
(Continued)

OTHER PUBLICATIONS

CH-628722-A—Machine Translation—English (Year: 1982).*
(Continued)

Primary Examiner — William S. Choi
(74) Attorney, Agent, or Firm — John C. Freeman; Crowell &Moring LLP (57) ABSTRACT A connection structure of a hose for transmission oil including a multilayer hose having a first rubber layer formed by a first pipe, a braided layer formed on an outer surface of the first rubber layer and formed by braiding aramid fibers. A second rubber layer located on the outer surface of the first rubber layer. A first connector including a body inserted into an inside of the first rubber layer and including a second pipe connected with the first pipe, and a stopper protruding from the body, and an inclined portion formed at an end of the body and forming an uphill slope of approximately 11°-17° to one side of the body. A second connector including a cover portion covering the multilayer hose and a plurality of pressurized portions formed concave with respect to an outer peripheral surface of the cover portion and in contact with the multilayer hose.

8 Claims, 8 Drawing Sheets

(56) References Cited

U.S. PATENT DOCUMENTS

| | | | |
|---|---|---|---|
| 5,044,671 A * | 9/1991 | Chisnell | F16L 33/2073 |
| 7,624,504 B2 | 12/2009 | Watanabe | |
| 11,287,069 B2 | 3/2022 | Zavorka et al. | |
| 2005/0001424 A1 | 1/2005 | Watanabe | |
| 2006/0277740 A1 | 12/2006 | Watanabe | |
| 2012/0161434 A1* | 6/2012 | Wells | F16L 33/01 |
| 2018/0356020 A1 | 12/2018 | Zavorka et al. | |

FOREIGN PATENT DOCUMENTS

| | | | | |
|---|---|---|---|---|
| JP | 2679802 | B2 | 11/1997 | |
| JP | 2018-052054 | A | 4/2018 | |
| KR | 10-2004-0094392 | A | 11/2004 | |
| KR | 10-2005-0092302 | A | 9/2005 | |
| KR | 10-2015-0017582 | A2 | 2/2015 | |
| KR | 10-1660475 | B1 | 10/2016 | |
| KR | 30-0883272 | S | 11/2016 | |
| KR | 10-2018-0133782 | A | 12/2018 | |
| KR | 10-2020-0139899 | A | 12/2020 | |
| KR | 10-2023-0076554 | A | 5/2023 | |
| WO | WO-9110860 | A * | 7/1991 | F16L 33/20 |
| WO | WO-2013157296 | A1 * | 10/2013 | |
| WO | WO-2021028537 | A1 * | 2/2021 | F16L 33/2071 |

OTHER PUBLICATIONS

WO-9110860-A—Machine Translation—English (Year: 1991).*
WO-2013157296-A1—Machine Translation—English (Year: 2013).*
KR-101660475-B1—Machine Translation—English (Year: 2016).*
WO-2021028537-A1—Machine Translation—English (Year: 2021).*
Office Action dated Dec. 14, 2023 from Korean Priority Application No. 10-2023-0165127 (21 pages).
Office Action dated Aug. 22, 2024 from Korean Priority Application No. 10-2023-0165127 (16 pages).

* cited by examiner

CONNECTION STRUCTURE OF OIL HOSE FOR TRANSMISSION

This application is based on and claims priority under 35 U.S.C. § 119 to Korean Patent Priority No. 10-2023-0165127 filed on Nov. 24, 2023, in the Korean Intellectual Property Office, the entire disclosure of which is herein incorporated by reference in its entirety.

BACKGROUND OF THE INVENTION

Technical Field

Various embodiments disclosed in this document relate to the connection structure of an oil hose and transmission.

Description of Related Art

In a power transmission element such as the transmission of vehicles, oil is used for the purpose of smooth operation, lubrication of mechanical friction elements, and cooling. In the case that the temperature of the oil used in the transmission is high, the oil may become acidic, which can reduce its durability.

To prevent such occurrences, the vehicle is equipped with an oil cooling device for efficient cooling of the transmission oil.

The above information may be provided as related art for the purpose of facilitating an understanding of this disclosure. No claim or decision is made as to whether any of the above can be applied as prior art in relation to this disclosure.

SUMMARY OF THE INVENTION

In the case that the temperature of the oil used in the transmission is high, the oil may become acidic, which can reduce its durability. Inside the vehicle, an oil cooling device can be placed to cool the oil used in the transmission. Oil cooling device of transmission in the vehicle can form a fluid line through a hose. For example, a fluid line connecting an oil cooling device to a transmission can form a closed circulation loop. The overheated oil released from the outlet of the transmission can pass through the oil cooling device and enter the inlet of the transmission. In addition, inside the hose that connects the oil cooling device to the inlet of the transmission, the cooled oil through the oil cooling device can flow. The hose that connects the oil cooling device and the transmission can allow hot or cold oil to flow inside, depending on the installation location. Therefore, the hose needs to be formed of a material that is resistant to high and low temperatures. In addition, since high pressure fluid can flow inside the hose, it is necessary to form a material that is resistant to high pressure.

On the other hand, the hose may be exposed to vibration depending on the environment in which it is used. For example, a hose can vibrate while the vehicle is running. In general, a separate connector is used to connect a hose to another device or to another hose. Therefore, to maintain the connection with other hoses while the hose is exposed to vibration, it is preferred for the hose and the connector, and the other hose and the connector respectively to be tightly joined to each other.

Technical problems to be solved in this document are not limited to the aforementioned technical problems, and other technical problems not described above may be easily understood from the following description by a person having ordinary knowledge in the art included in this document.

The connection structure of a hose for transmission oil according to various embodiments disclosed in this document may include a multilayer hose including the first rubber layer formed by the first pipe, the braided layer formed on the outer surface of the first rubber layer and formed by braiding aramid fibers, and the second rubber layer located on the outer surface of the first rubber layer; a first connector including a body inserted into the inside of the first rubber layer and including a second pipe connected with the first pipe, a stopper protruding from the body, and an inclined portion formed at the end of the body and forming an uphill slope of approximately 11°-17° to one side of the body toward the stopper; and a second connector including a cover portion covering the multilayer hose and a plurality of pressurized portions formed concave with respect to the outer peripheral surface of the cover portion and in contact with the multilayer hose.

According to various embodiments disclosed in this document, it is possible to disclose a multilayer hose that can be used under high pressure, extremely high temperature, and cryogenic condition and connect the transmission with the oil cooling device.

According to various embodiments disclosed in this document, the connector connecting a multilayer hose to another multilayer hose may present a structure that is joined tightly to the multilayer hose. Therefore, the multilayer hose and the connector may maintain their coupling under external vibration. In addition, the tightly-joined structure of the multilayer hose and the connector may prevent the oil flowing inside the multilayer hose from spilling out to the outside of the multilayer hose.

The effects obtainable in this disclosure are not limited to the aforementioned effects, and other effects not mentioned may be easily understood from the following description by a person having ordinary knowledge in the art to which the disclosure pertains.

BRIEF DESCRIPTION OF THE DRAWINGS

With regard to the description of the drawing, the same or similar reference numerals may be used for the same or similar components.

DETAILED DESCRIPTION

In the following description, various embodiments of this document are described with reference to the attached drawings. The various embodiments of this document and the terms used herein are not intended to limit the technological features set forth in this document to particular embodiments, but should be understood to include various changes, equivalents, or replacements for a corresponding embodiment.

With regard to the description of the drawing, similar reference numerals may be used for similar or related elements. The singular form of a noun corresponding to an item may include one or more of the items, unless the relevant context clearly indicates otherwise.

In this document, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. Such terms as "1st" and "2nd," or "first" and "second" may be used to simply distinguish a corresponding component from another, and does not limit the components in other aspect (e.g., importance or order). If an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

Figures 1A, 1B:
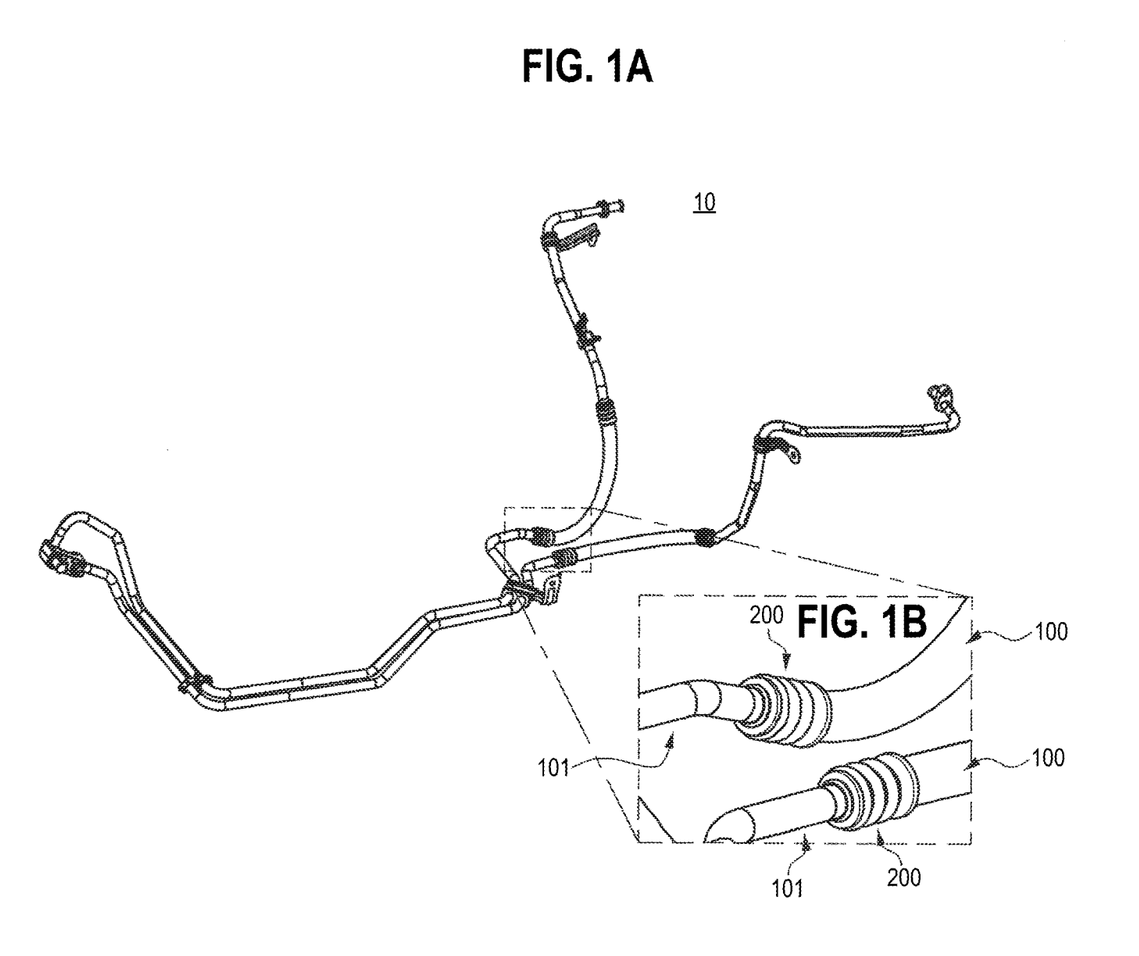
FIG. 1A, according to one embodiment of this disclosure, is a perspective view of a fluid line connecting an oil cooling device and a transmission.
FIG. 1B is an enlarged view of a portion of the fluid line of FIG. 1A.

FIGS. 1A and 1B, according to one embodiment of this disclosure, are perspective views of a fluid line connecting an oil cooling device and a transmission.

According to one embodiment, the vehicle may include a power transmission element such as a transmission (e.g., a gearbox). A transmission may be a configuration that transmits power from the vehicle's engine to the wheels. In one embodiment, the vehicle may change gears and change the torque applied to the wheels via the transmission.

According to one embodiment, oil may be used for the purpose of smooth operation, lubrication of mechanical friction elements, and cooling in a power transmission element such as a transmission. In the case that the oil used in the transmission is overheated, it may become acidic or lose its durability, which can cause the transmission to fail. To prevent such occurrences, the vehicle may be equipped with an oil cooling device for efficient cooling of the transmission.

In one embodiment, with reference to FIGS. 1A and 1B, a fluid line connecting the oil cooling device and the transmission may be disposed inside the vehicle. The fluid line may connect the oil cooling device and the transmission and may consist of oil-flowing hoses 100 and 101. In one embodiment, hoses 100 and 101 may each be multilayer hoses (e.g., a multilayer hose 100 of FIG. 2) that may be used in high pressure, high temperature, and low temperature conditions. The fluid line may be a closed circulation loop in which the oil that is overheated in the transmission is cooled through an oil cooling device and then flows into the transmission.

In one embodiment, with reference to FIGS. 1A and 1B, a plurality of hoses 100 and 101 including a fluid line may be connected via the connector assembly 200. For example, one multilayer hose 100 (e.g., a multilayer hose 100 of FIG. 2) and another multilayer hose 101 (e.g., a multilayer hose 100 of FIG. 2) may be connected via the connector assembly 200. According to one embodiment, the connector assembly 200 may connect and seal plural multilayer hoses 100 and 101. Therefore, the leakage of oil flowing inside the hoses 100 and 101 between the connector assembly 200 and the hoses 100 and 101 can be prevented. The description of the connector assembly 200 is described in detail in the drawings shown in FIGS. 3A and 3B.

Figure 2:
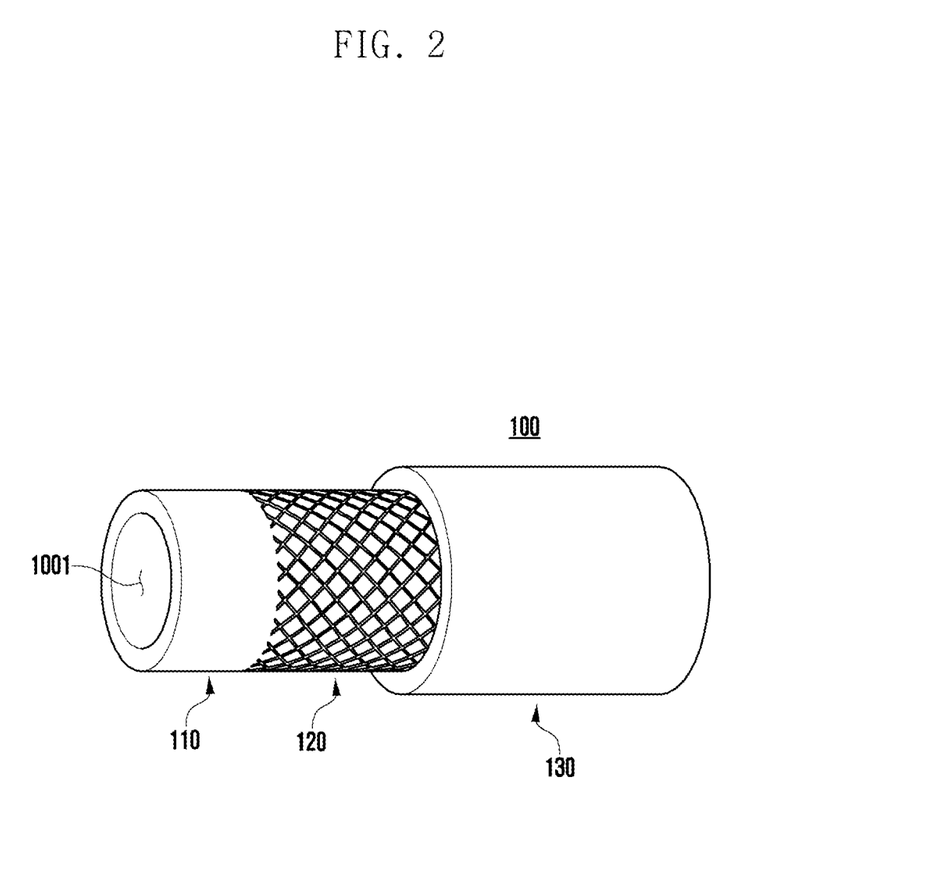
FIG. 2 is a diagram of a multilayer hose connecting an oil cooling device and a transmission according to one embodiment of this disclosure.

FIG. 2 is a diagram of a multilayer hose connecting an oil cooling device and a transmission according to one embodiment of this disclosure.

The hoses 100 and 101 including the fluid line described above may each be of the same configuration as the multilayer hose 100 shown in FIG. 2. Therefore, the description of the hoses 100 and 101 including the fluid line is to be replaced by the description of the multilayer hose 100 shown in FIG. 2.

According to one embodiment, as shown in FIG. 2, the hose through which the transmission oil flows may consist of a multilayer hose 100. In one embodiment, the multilayer hose 100 may include a first rubber layer 110 located on the inner side, a braided layer 120 formed by braiding on the outer surface of the first rubber layer 110, and a second rubber layer 130 located on the outside of the multilayer hose 100. The hose 101 may have a similar multilayer structure as described previously with respect to the multilayer hose 101 of FIG. 2.

In one embodiment shown in FIG. 2, the first rubber layer 110 may include the first pipe 1001 through which the transmission oil flows. In one embodiment, the first connector 210 may be inserted into the inside of the first rubber layer 110. In one embodiment, as described later, the first connector 210 may be inserted into the first pipe 1001 of the first rubber layer 110. In this case, the inclined portion 214 of the first connector 210 may be the first part to be inserted into the first rubber layer 110 in the configuration of the first connector 210. In one embodiment, the inner diameter D'1 of the first rubber layer 110 may be formed smaller than the outer diameter D1 of the outermost end of the body 211 of the first connector 210. Therefore, the first rubber layer 110 and the first connector 210 may be joined tightly.

In one embodiment, with reference to FIG. 2, the braided layer 120 may be located on the outer surface of the first rubber layer 110. In one embodiment, the braided layer 120 may be located between the outer surface of the first rubber layer 110 and the inner surface of the second rubber layer 130.

In one embodiment, the braided layer 120 may be formed along the outer peripheral surface of the first rubber layer 110 through a braiding process. The braiding process may be formed by inserting a mandrel (not shown) into the inside of the first rubber layer 110, and then braiding the braided layer 120 using a braiding machine (not shown).

In one embodiment, the braided layer 120 may consist of a plurality of braids. Braids may be made up of aramid fibers. An aramid fiber is a kind of synthetic fiber, which may have high strength and heat resistance.

In one embodiment, the braided layer 120 may be a set of braids formed on the outer peripheral surface of the first rubber layer 110 through a braider. In one embodiment, the braided layer 120 may be a structure in which a plurality of braids are formed in a net shape. In one embodiment, one braid may be formed on the outer peripheral surface of the first rubber layer 110 with a pitch of about 30~50 mm. The pitch can be the distance traveled when the braid is rotated for one turn. For example, the pitch may be the gap between the first point and the second point which is the same position as the first point when the braid is rotated at the first point of the first rubber layer 110.

In one embodiment, with reference to FIG. 2, the second rubber layer 130 may be located on the outer surface of the first rubber layer 110. In one embodiment, the second rubber layer 130 may be a configuration that forms the outer surface of the multilayer hose 100.

In one embodiment, the first rubber layer 110 and the second rubber layer 130 may be formed of a material that can be used under low temperature, high temperature and high pressure conditions. The high pressure condition may be the state of an increased internal pressure of the multilayer hose 100. In one embodiment, the first rubber layer 110 and the second rubber layer 130 may be formed from any of the following materials: acrylic rubber (ACM, Acrylate-chloroethyl vinylether monomer), ethylene acrylic rubber (AEM, ethylene acrylic elastomer), fluorinated rubber (FKM, fluorinated vinylidene monomer), and hydrogen nitrile rubber (H-NBR, hydrogenated acrylonitrile-butadiene rubber). In one embodiment, the first rubber layer 110 and the second rubber layer 130 may be formed through a plurality of combinations of acrylic rubber, ethylene acrylic rubber, fluorinated rubber, and hydrogen nitrile rubber.

In one embodiment, acrylic rubber (ACM) may have a certain level of heat resistance, oil resistance, weather resistance, and ozone resistance. In one embodiment, acrylic rubber may be used in an environment of around −20° C. to 170° C.

In one embodiment, ethylene acrylic rubber (AEM) may have a certain level of heat resistance, oil resistance, weather resistance, and ozone resistance. In one embodiment, ethylene acrylic rubber may be used in an environment of approximately −35° C. to 170° C.

In one embodiment, hydrogen nitrile rubber (H-NBR) may have a certain level of abrasion resistance, low temperature resistance, oil resistance, fuel oil resistance, chemical resistance, permanent compression set resistance, heat resistance, and ozone resistance. In one embodiment, hydrogenated nitrile rubber may be used in an environment of about −40° C. to 140° C.

In one embodiment, fluorinated rubber (FKM) may have a certain level of weather resistance, heat resistance, oil resistance, fuel oil, and chemical resistance. In one embodiment, fluorinated rubber may be used in an environment of about −20° C. to 250° C.

According to one embodiment of this disclosure, the multilayer hose 100 may include a first rubber layer 110, a braided layer 120, and a second rubber layer 130. In one embodiment, the multilayer hose 100 may be used in a high to low temperature state of approximately −40° C. to 150° C. and in a high pressure state of approximately 140 kpa to 2069 kpa as the first rubber layer 110 and the second rubber layer 130 are formed of any of the acrylic rubber, ethylene acrylic rubber, fluorinated rubber, and hydrogen nitrile rubber, and the braided layer 120 of aramid material is formed on the outer surface of the first rubber layer 110.

Figures 3A, 3B:
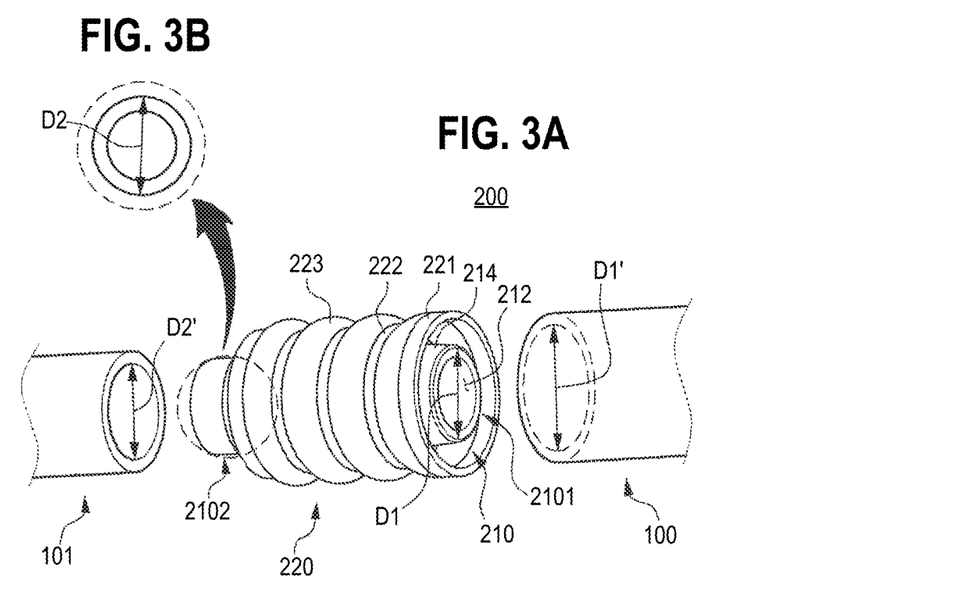
FIG. 3A is a diagram of a connector assembly connecting different multilayer hoses according to one embodiment of this disclosure.
FIG. 3B shows an outer diameter of an end of a connector of the connector assembly of FIG. 3A.
Figure 4A:
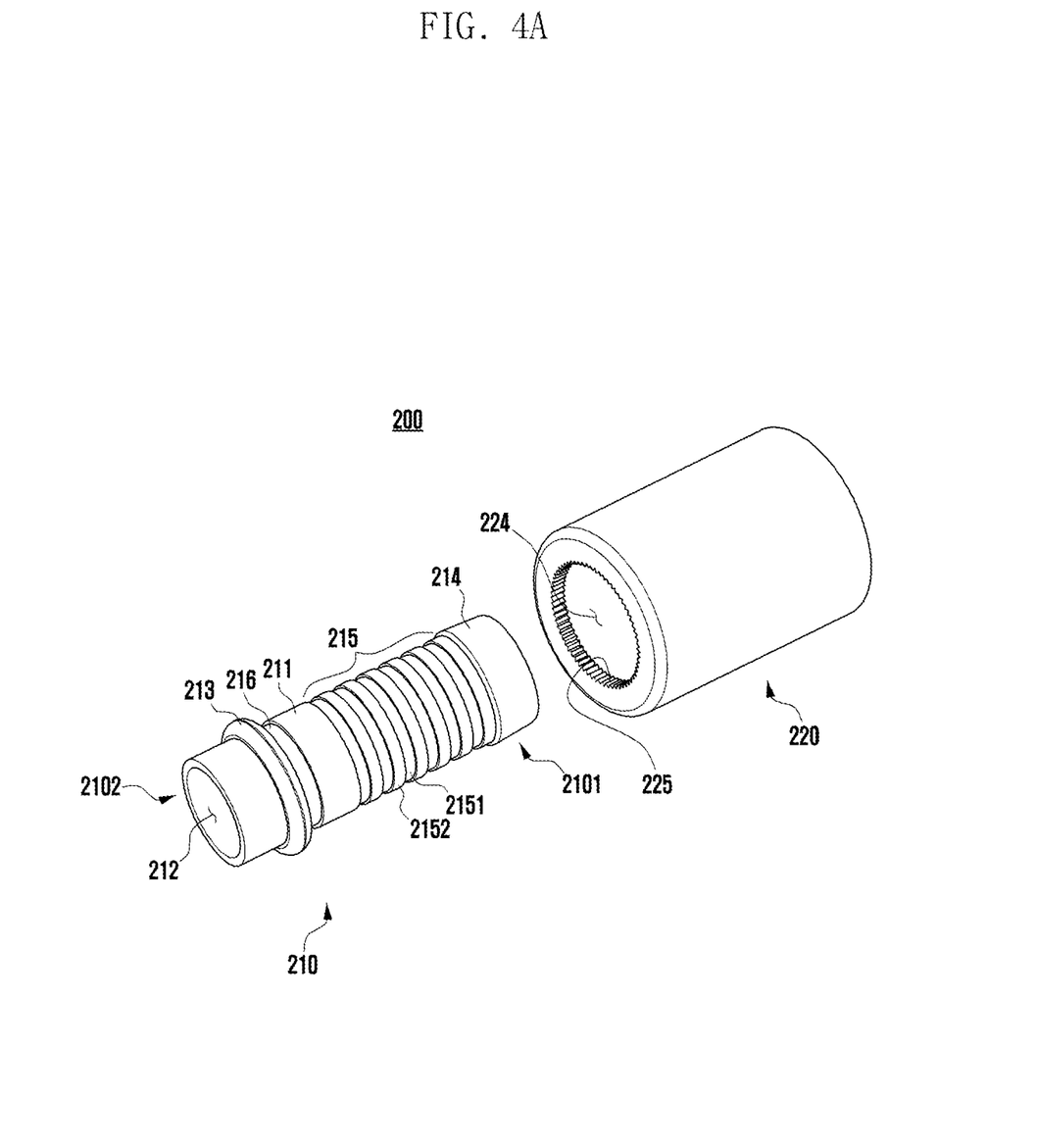
FIG. 4A is a diagram illustrating a portion of an assembly process for the connector assembly of FIG. 3 according to one embodiment of this disclosure.
Figure 4B:
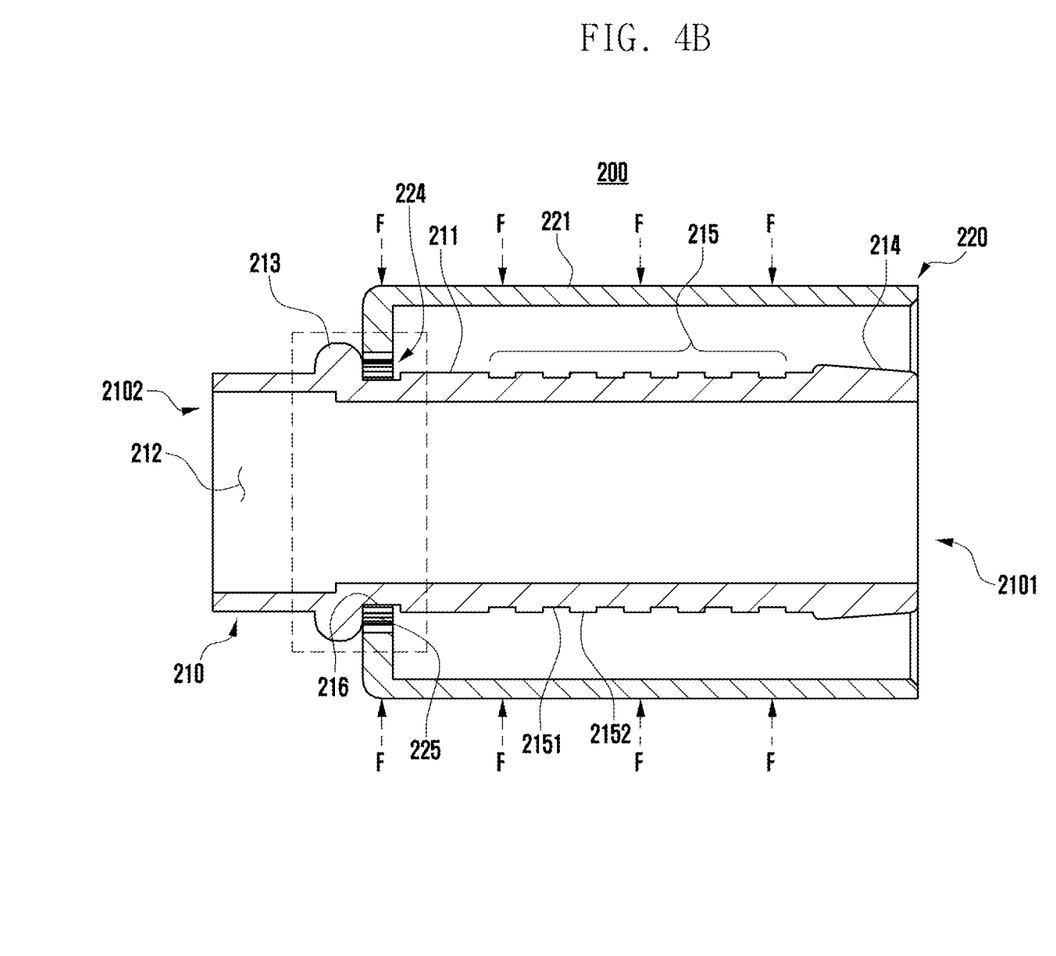
FIGS. 4B to 4C are diagrams illustrating an assembly process of the connector assembly of FIG. 4A during and after undergoing a swaging process according to one embodiment of this disclosure.
Figure 4C:
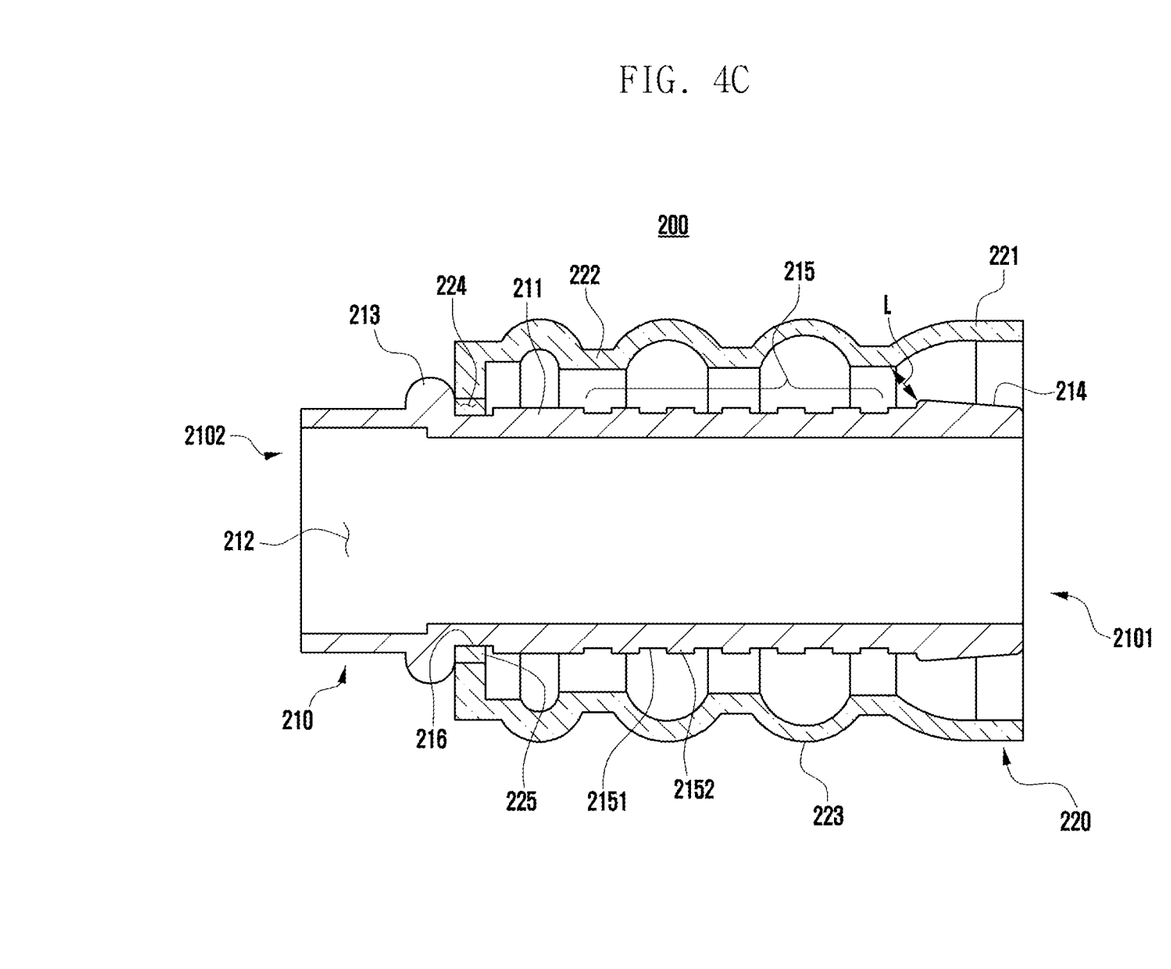
Figure 5A:
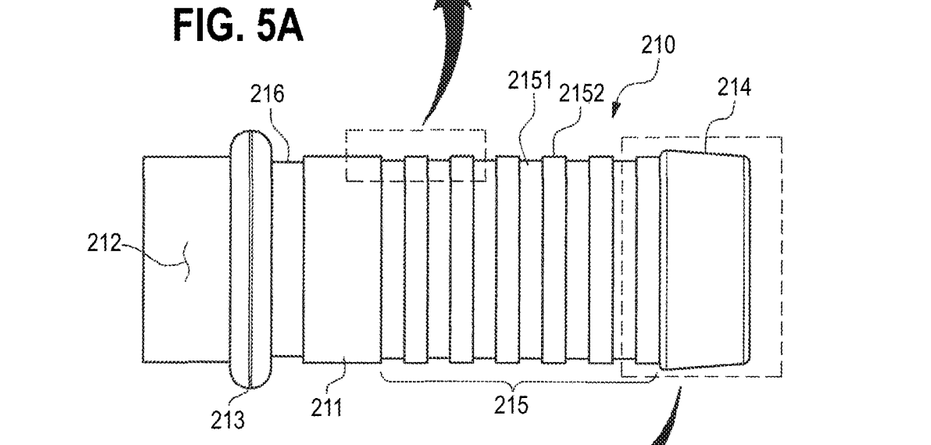
FIG. 5A is a diagram illustrating irregularities and an inclined portion formed at the end of the first connector according to one embodiment of this disclosure.
Figure 5B:
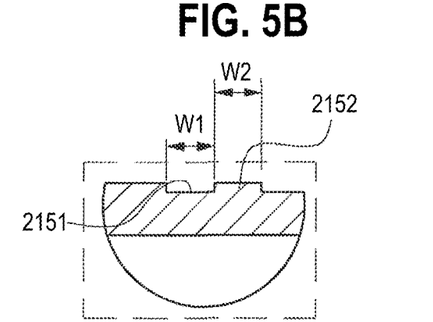
FIG. 5B is a cross-sectional view of a portion of the first connector of FIG. 5A.
Figure 5C:
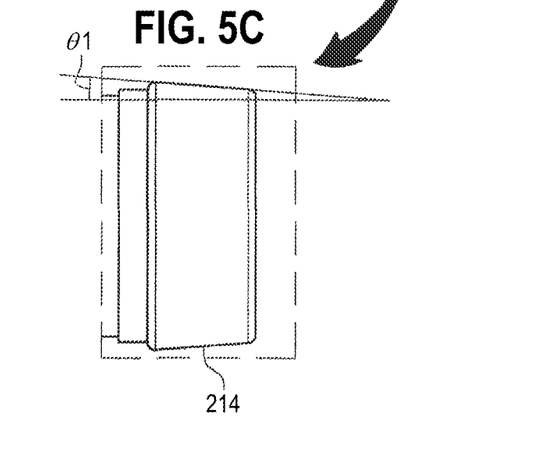
FIG. 5C is an enlarged view of an inclined portion of the first connector of FIG. 5A.
Figure 6A:
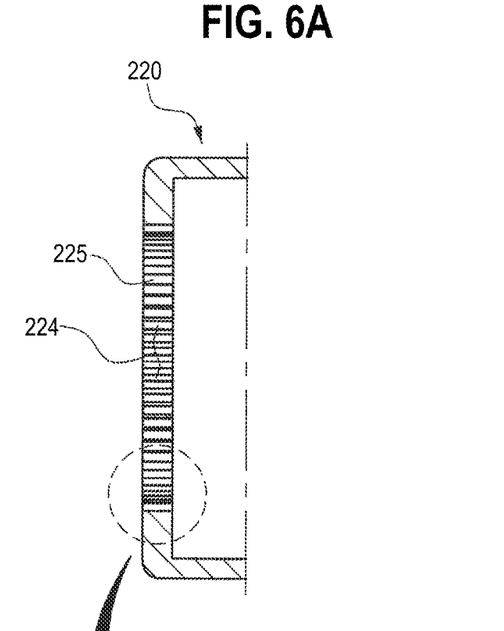
FIG. 6A is a diagram illustrating a serration formed on the second connector according to one embodiment of this disclosure.
Figure 6B:
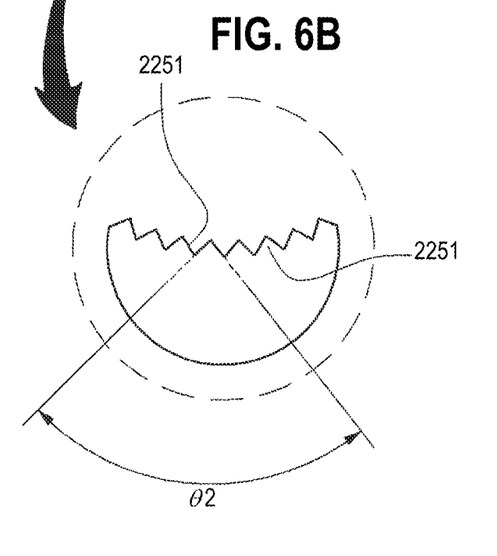
FIG. 6B is an enlarged view of a portion of the serration of FIG. 6A.

FIGS. 3A and 3B are diagrams of a first embodiment of a connector assembly connecting different multilayer hoses according to one embodiment of this disclosure. FIG. 4A is a diagram illustrating an assembly process of the connector assembly of FIGS. 3A and 3B according to one embodiment of this disclosure. FIGS. 4B to 4C are diagrams illustrating an assembly process of the connector assembly of FIG. 4A during and after undergoing a swaging process according to one embodiment of this disclosure. FIGS. 5A to 5C are diagrams illustrating irregularities and an inclined portion formed at the end of the first connector according to one embodiment of this disclosure. FIGS. 6A and 6B are diagrams illustrating a serration formed on the second connector according to one embodiment of this disclosure.

According to one embodiment, as shown in FIGS. 3A and 3B, the multilayer hoses 100 and 101 connecting the transmission and the oil cooler may be connected via the connector assembly 200. In one embodiment, the connector assembly may include a first connector 210 and a second connector 220. In one embodiment, the first connector 210 may be configured to connect a plurality of multilayer hoses 100 and 101. For example, one end 2101 (e.g., an end) of the first connector 210 may be inserted into one of the multilayer hoses 100, and the other end 2102 may be inserted into another multilayer hose 101. The second connector 220 may be a configuration that pressurizes the multilayer hose 100 inserted into the first connector 210. That is, the second connector 220 may be configured to fix the multilayer hose 100 to the first connector 210. The multilayer hose 100 may be joined tightly against the first connector 210 through the second connector 220. Therefore, the multilayer hose 100 may not be separated from the first connector 210 in an environment where vibrations are applied. In addition, the leakage of oil flowing through the multilayer hose 100 into the gap between the multilayer hose 100 and the first connector 210 may be prevented.

In one embodiment, with reference to FIGS. 3A and 3B, the outer diameter D1 of one end 2101 of the first connector 210 (e.g., the end 2101 of the first connector 210 or the end 2101 of the body 211 of the first connector 210) may be larger than the inner diameter D'1 of the multilayer hose 100. In one embodiment, the outer diameter D2 of the other end 2102 of the first connector 210 may be larger than the inner diameter D'2 of the other multilayer hose 101. Therefore, the multilayer hoses 100 and 101 may be joined tightly against the first connector 210.

According to one embodiment, as shown in FIGS. 4A, 4B, and 4C, the sequence of processes by which connector assembly 200 is assembled may be as follows.

In one embodiment, with reference to FIG. 4A, the first connector 210 may be inserted into the inside of the second connector 220 through the opening 224 of the second connector 220. Subsequently, in one embodiment not shown in the diagram, the multilayer hose 100 may be inserted into the end 2101 of the first connector 210 by being inserted into the inside of the second connector 220. For example, one end 2101 of the first connector 210 may be inserted into the inside of the first rubber layer 110 of the multilayer hose 100. In one embodiment, the first rubber layer 110 may be stably fixed to the first connector 210 as the outer diameter D1 of the outermost end of the first connector 210 is formed larger than the inner diameter of the first rubber layer 110 D'1.

Subsequently, though a swaging process illustrated in FIGS. 4B and 4C, one or more portions of the exterior of the second connector 220 may be pressurized in the direction of the first connector 210. In one embodiment, with reference to FIG. 4B, the second connector 220 may include a cover portion 221 covering the first connector 210. While the multilayer hose 100 is inserted into the first connector 210, the cover portion 221 of the second connector 220 of FIG. 4A may be subjected to an external force F toward the multilayer hose 100 at multiple portions of the cover portion 221 as shown in FIG. 4B. For example, the swaging mechanism used in the swaging process may compress a portion of the cover portion 221 of the second connector 220.

In one embodiment, with reference to FIG. 4C, the second connector 220 may result in a repetition of concave and convex shapes through the swaging process performed per FIG. 4B. In the following, the concave portion formed in the second connector 220 through the swaging process will be described as the pressurized portion 222. The pressurized portion 222 may be a configuration formed by the swaging mechanism pressurizing the cover portion 221 toward the multilayer hose 100. The convex shape of the second connector 220 is to be described as a protrusion 223. The protrusion 223 may be part of the uncompressed cover portion 221 through the swaging mechanism in the swaging process.

In one embodiment, the pressurized portion 222 of the second connector 220 may pressurize the exterior of the multilayer hose 100. The multilayer hose 100 may be joined tightly to the first connector 210 by the exterior of the multilayer hose 100 being pressurized through the second connector 220 while the multilayer 100 is inserted into the first connector 210.

The following describes the detailed configuration of the first connector 210 and the second connector 220.

According to one embodiment, as shown in FIGS. 4A to 4C, and 5A to 5C, the first connector 210 may include a body 211, a stopper 213 protruding from the body 211, an inclined portion 214 located at the end 2101 of the body 211, irregularities 215 consisting of the convex portion 2152 and the concave portion 2151, and/or a contact portion 216 that is in contact with the serration 225 of the second stopper 213. At least one of the above configurations may be omitted or at least one configuration may be added.

In one embodiment, with reference to FIGS. 4A to 4C and 5A to 5C, the body 211 may be the main body of the first connector 210. In one embodiment, the body 211 may include a second pipe 212. In one embodiment, the first pipe 1001 of the multilayer hose 100 and the second pipe 212 of the body 211 may be connected as the body 211 is inserted into the inside of the multilayer hose 100.

In one embodiment, with reference to FIGS. 4A to 4C and 5A to 5C, the stopper 213 may be formed by protruding along the outer periphery of the body 211. In one embodiment, the stopper 213 may be a detent that prevents the second connector 220 from passing through the first connector 210 when the first connector 210 is inserted into the opening 224 of the second connector 220, as shown in FIG. 4A.

In one embodiment, with reference to FIGS. 5A to 5C, the inclined portion 214 of the first connector 210 may be located at the end 2101 of the body 211. In one embodiment, the end of body 211 may be the first portion to be inserted into the inside of the multilayer hose 100. In one embodiment, the inclined portion 214 may be formed in a sloping form along the outer peripheral surface of the body 211 at the end of the body 211. In one embodiment, the inclined portion 214 may consist of an uphill slope from the end of body 211 toward the stopper 213. In one embodiment, the inclined portion 214 may be formed at various angles. For example, the angle $\theta 1$ of the inclined portion 214 may be formed preferably about 11°-17° with respect to one side of the body 211. One side of the body 211 may be flat. Therefore, the angle $\theta 1$ of the inclined portion 214 may be formed about 11°-17° with respect to the plane.

In one embodiment, with reference to FIGS. 4A to 4C and 5A to 5C, the outermost end of body 211 (e.g., the outermost end of the first connector 210) may be the starting point of the inclined portion 214. In one embodiment, the outer diameter D1 of the outermost end of the body 211 may be about 15.9 mm to 16.1 mm. In addition, the end of the inclined portion 214 may be formed with an outer diameter greater than the outermost end of the body 211. Here, the end of the inclined portion 214 may be the point at which the slope ends. For example, the outer diameter of the end of the inclined portion 214 may be about 16.8 mm to 17.2 mm. In one embodiment, the outer diameter of the outermost end of body 211 and the outer diameter of the end of the inclined portion 214 may be formed larger than the inner diameter D'1 of the first rubber layer 110. Therefore, the multilayer hose 100 may be joined tightly against the first connector 210.

In one embodiment, the slope of the included portion 214 may prevent oil flowing on the multilayer hose 100 from spilling between the first connector 210 and the multilayer hose 100. For example, viscous oils may lose fluidity on sloping sections.

In one embodiment, with reference to FIG. 4C, the gap L between the first connector 210 and the pressurized portion 222 of the second connector 220 may be reduced as an inclined portion 214 is formed at the end of the first connector 210. For example, if an inclined portion 214 is formed that constitutes an uphill slope from the end 2101 of the first connector 210 to the stopper 213, the gap L between the end of the inclined portion 214 and the pressurized portion 222 of the second connector 220 may be reduced than the gap between the end of the inclined portion 214 and the pressurized portion 222 of the second connector 220 without an inclined portion 214 formed at the end of the first connector 210. Therefore, compared to when the inclined portion 214 is not formed at the end of the first connector 210, the multilayer hose 100 may be joined tightly against the first connector 210 by being compressed at the end of the first connector 210 through the end of the inclined portion 214 and the pressurized portion 222 of the second connector 220. Therefore, the multilayer hose 100 may not be separated from the first connector 210 in an environment where vibrations are applied. In addition, oil leakage into the gap between the multilayer hose and the first connector 210 may be prevented.

In one embodiment, with reference to FIGS. 4A to 4C and 5A to 5C, the first connector 210 may include irregularities 215 consisting of a convex portion 2152 and a concave portion 2151. In one embodiment, irregularities 215 may form along the outer peripheral surface of the body 211. In one embodiment, the concave portion 2151 may be a groove formed on one side along the outer periphery of the body 211 of the first connector 210. The convex portion 2152 may be a part that is relatively protruded compared to the concave portion 2151. In one embodiment, the irregularities 215 may prevent the body 211 from being damaged by dispersing the external force applied through the pressurized portion 222 when one side of the body 211 is pressurized through the pressurized portion 222 of the second connector 220 in the swaging process.

In one embodiment, with reference to FIGS. 5A to 5C, the width W1 of the concave portion 2151 and the width W2 of the convex portion 2152 may preferably be about 1.7 mm to 1.9 mm.

In one embodiment, with reference to the second connector 220 of FIG. 4C, the concave portion 2151 of the first connector 210 may be located correspondingly with the pressurized portion 222 of the second connector 220. In one embodiment, in the swaging process, the swaging mechanism forming the pressurized portion 222 of the second connector 220 may be located corresponding to at least one of the plural concave portions 2151 of the first connector 210. The pressurized portion 222 is formed in a position corresponding to the swaging mechanism, so that it may be located corresponding to at least one of the plural concave portions 2151 of the first connector 210.

In one embodiment, when the second connector 220 is compressed through the swaging mechanism while the multilayer hose 100 is inserted into the first connector 210, if the swaging mechanism does not correspond to the concave portion 2151 of the first connector 210, a portion of the multilayer hose 100 may be pressurized to the edge of the convex portion 2152 of the irregularities 215 and be damaged. According to one embodiment of this disclosure, when the multilayer hose 100 is pressurized through the swaging mechanism as the swaging mechanism is positioned to correspond to at least one of the plural concave portions 2151 of the first connector 210, the multilayer hose 100 may be joined tightly against the concave portion 2151 of the irregularities 215. In other words, as the swaging mechanism is positioned to correspond to at least one of the plural concave portions 2151 of the first connector 210, the pressurized portion 222 of the second connector 220 formed through the swaging mechanism may press the multilayer hose tightly to the concave portion 2151 of the first connector 210. Therefore, the multilayer hose 100 may be compressed to the first connector 210 without damage in the swaging process.

According to one embodiment, as shown in FIGS. 4A to 4C and 6A and 6B, the second connector 220 may include a serration 225. In one embodiment, the serration 225 may be a structure formed in a serrated or grooved shape on one side of the second connector 220 along the periphery of the opening 224 of the second connector 220. In one embodiment, the serration 225 of the second connector 220 may be contacted with a contact portion 216 of the first connector 210. In one embodiment, the contact portion 216 may be a groove formed along the outer periphery of the body 211 at a position adjacent to the stopper 213 of the first connector 210. In one embodiment, the serration 225 may increase the cohesion between the configurations. For example, the second connector 220 may be joined tightly to the first connector 210 via the serration 225. In one embodiment, the serration 225 may prevent the first connector 210 from rotating with respect to the second connector 220.

In one embodiment, the serration 225 may consist of a plurality of teeth 2251. In one embodiment, the angle θ2 between neighboring teeth 2251 may preferably be about 81.7°. In one embodiment, the height of the tooth 2251 may preferably be about 0.5 mm.

According to one embodiment, the thickness of the multilayer hose 100 can be compressed to about 30%~50% after being coupled to the connector assembly 200. In one embodiment, the compression of the multilayer hose 100 may be calculated through mathematical equation 1.

$$\frac{b-a}{a} \times 100 \qquad \text{Equation 1}$$

a may be the thickness of the multilayer hose 100 before the first connector 210 is inserted into the inside the first rubber layer 110. b may be the thickness of the multilayer hose in the state that the first connector 210 is inserted into the inside the first rubber layer 110 and the outer surface of the multilayer hose 100 is pressurized and compressed through the pressurized portion 222 of the second connector 220.

According to one embodiment, connector assemblies may be formed of a variety of materials. For example, the first connector 210 and the second connector 220 may be formed of a metal material and/or a non-metallic material. Here, metal materials may include alloys such as aluminum, stainless steel (STS, SUS), iron, magnesium, titanium, etc., while non-metallic materials may include synthetic resins, ceramics, and engineering plastics.

The connection structure of a hose for transmission oil of this disclosure may include a multilayer hose 100 and 101 including the first rubber layer 110 formed by the first pipe 1001, the braided layer 120 formed on the outer surface of the first rubber layer and formed by braiding aramid fibers, and the second rubber layer 130 located on the outer surface of the first rubber layer; a first connector including a body inserted into the inside of the first rubber layer and including a second pipe connected with the first pipe, a stopper protruding from the body, and an inclined portion formed at the end of the body and forming an uphill slope of approximately 11°-17° to one side of the body toward the stopper; and a second connector 220 including a cover portion 221 covering the multilayer hose and a plurality of pressurized portions 222 formed concave with respect to the outer peripheral surface of the cover portion and in contact with the multilayer hose.

In addition, the outer diameter D1 of the outermost end of the body may be greater than the inner diameter D'1 of the first rubber layer.

In addition, the first rubber layer and the second rubber layer of the multilayer hose may be formed of any of the acrylic rubber (ACM, acrylate-chloroethyl vinylether monomer), ethylene acrylic rubber (AEM, ethylene acrylic elastomer), fluorinated rubber (FKM, fluorinated vinylidene monomer) and hydrogen nitrile rubber (H-NBR, hydrogenated acrylonitrile-butadiene rubber).

In addition, the first connector may include irregularities 215 formed by repeating the convex portion 2152 and the concave portion 2151 on the outer peripheral surface of the body, and at least one of the plural pressurized portions of the second connector may be formed in a position corresponding to the concave portion of the first connector.

In addition, the width of the concave portion W1 and the width of the convex portion W2 may be approximately 1.7 mm to 1.9 mm.

In addition, the compression rate of the multilayer hose calculated according to the following mathematical equation 1 below may be 30%~50%.

$$\frac{b-a}{a} \times 100 \qquad \text{Equation 1}$$

(a: the thickness of the multilayer hose before the first connector is inserted into the inside of the first rubber layer, b: the thickness of the multilayer hose in a state where the first connector is inserted into the inside of the first rubber layer and the outer surface of the multilayer hose is pressurized and compressed through the pressurized portion of the second connector).

In addition, the braided layer may include a braid wound with a pitch of approximately 30 mm to 50 mm along the outer surface of the first rubber layer.

In addition, the second connector may include a serration 225 including an opening 224, and a tooth 2251 formed along the periphery of the opening and in contact with the first connector.

In addition, the angle $\theta 2$ between the neighboring teeth may be 81.7°.

According to various embodiments disclosed in this document, it is possible to disclosure a multilayer hose that can be used under high pressure, extremely high temperature, and cryogenic condition and connect the transmission with the oil cooling device.

According to various embodiments disclosed in this document, the connector assembly 200 connecting the multilayer hose 100 to another multilayer hose 101 may present a structure that adheres closely to the multilayer hose 100 and 101. Therefore, the multilayer hose 100 and 101 and connector assembly 200 may maintain their coupling under external vibration. In addition, the adhesive structure of the multilayer hose 100 and 101 and the connector assembly 200 may prevent the oil flowing inside the multilayer hose 100 and 101 from spilling out to the outside of the multilayer hose 100 and 101.

It is understood that this disclosure considers and includes embodiments based on any two or more combinations of the embodiments disclosed and embodiments comprising any combination of the features of the disclosed embodiments, in addition to the embodiments disclosed above. That is, the absence of an explicit indication that two features can be combined, or that two embodiments may be combined, does not mean that such a combination is not envisaged, but that such a combination must be seen as being included here.

EXPLANATION OF REFERENCE NUMERALS

100: multilayer hose
110: first rubber layer
120: braided layer
130: second rubber layer
210: first connector
220: second connector

We claim:

1. A connection structure of a hose for transmission oil comprising:
    a multilayer hose comprising:
        a first rubber layer formed by a first pipe;
        a braided layer formed on an outer surface of the first rubber layer and formed by braiding aramid fibers; and
        a second rubber layer located on the outer surface of the first rubber layer;
    a first connector comprising:
        a body inserted into an inside of the first rubber layer;
        a second pipe connected with the first pipe;
        a stopper protruding from the body; and
        an inclined portion formed at an end of the body and forming an uphill slope of approximately 11° to 17° to one side of the body toward the stopper; and
    a second connector comprising:
        a cover portion covering the multilayer hose; and
        a plurality of pressurized portions formed concave with respect to an outer peripheral surface of the cover portion and in contact with the multilayer hose;
    wherein the first connector comprises irregularities formed by repeating convex portions and concave portions on an outer peripheral surface of the body; and
    at least one of the plurality of pressurized portions of the second connector is formed in a position corresponding to one of the concave portions of the first connector; and
    wherein an end of the inclined portion protrudes in a radial direction more than the convex portions from the outer peripheral surface of the body.

2. The connection structure of a hose for transmission oil of claim 1, wherein an outer diameter of an outermost end of the body is greater than an inner diameter of the first rubber layer in a state prior to application of elastic force.

3. The connection structure of a hose for transmission oil of claim 1, wherein the first rubber layer and the second rubber layer of the multilayer hose are formed of one of the following materials: acrylate-chloroethyl vinyl ether monomer, ethylene acrylic rubber, fluorinated vinylidene monomer, and hydrogenated nitrile rubber.

4. The connection structure of a hose for transmission oil of claim 1, wherein a width of the concave portion and the convex portion of the first connector is approximately 1.7 mm to 1.9 mm, respectively.

5. The connection structure of a hose for transmission oil of claim 1, wherein a compression ratio of the multilayer hose calculated according to mathematical Equation 1 below is approximately 30% to 50%

$$\frac{b-a}{a} \times 100, \qquad \text{Equation 1}$$

wherein:
    a: a thickness of the multilayer hose before the first connector is inserted into the inside of the first rubber layer; and
    b: a thickness of the multilayer hose in a state where the first connector is inserted into the inside of the first rubber layer and an outer surface of the multilayer hose is pressurized and compressed through one of the plurality of pressurized portions of the second connector.

6. The connection structure of a hose for transmission oil of claim 1, wherein the braided layer comprises a braid wound with a pitch of approximately 30 mm to 50 mm along the outer surface of the first rubber layer.

7. The connection structure of a hose for transmission oil of claim 1, wherein the second connector comprises a serration comprising an opening and a tooth formed along an outer periphery of the opening and in contact with the first connector.

8. The connection structure of a hose for transmission oil of claim 7, wherein the serration comprises a second tooth, wherein the opening is between and adjacent to the tooth and the second tooth, wherein an angle between the tooth and the second tooth is 81.7°.

\* \* \* \* \*